US012350906B2

(12) United States Patent
Hagen et al.

(10) Patent No.: US 12,350,906 B2
(45) Date of Patent: Jul. 8, 2025

(54) COMPOSITE PANE WITH AN ELECTRICALLY CONDUCTIVE COATING AND AT LEAST ONE LAYER COMPRISING SELECTIVELY ABSORBING NANOPARTICLES

(71) Applicant: SAINT-GOBAIN GLASS FRANCE, Courbevoie (FR)

(72) Inventors: Jan Hagen, Bonn (DE); Günther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 98 days.

(21) Appl. No.: 18/262,855

(22) PCT Filed: May 19, 2022

(86) PCT No.: PCT/EP2022/063630
§ 371 (c)(1),
(2) Date: Jul. 25, 2023

(87) PCT Pub. No.: WO2022/253584
PCT Pub. Date: Dec. 8, 2022

(65) Prior Publication Data
US 2024/0083146 A1    Mar. 14, 2024

(30) Foreign Application Priority Data
May 31, 2021  (EP) ..................... 21176790

(51) Int. Cl.
*B32B 15/04* (2006.01)
*B32B 17/06* (2006.01)
*B32B 17/10* (2006.01)

(52) U.S. Cl.
CPC .. *B32B 17/10229* (2013.01); *B32B 17/10036* (2013.01); *B32B 17/10449* (2013.01);
(Continued)

(58) Field of Classification Search
CPC .................................... B32B 17/10036
(Continued)

(56) References Cited

U.S. PATENT DOCUMENTS

| 2007/0020465 A1 | 1/2007 | Thiel et al. |
| 2007/0082219 A1 | 4/2007 | Fleury et al. |

(Continued)

FOREIGN PATENT DOCUMENTS

| EP | 1 880 243 A2 | 1/2008 |
| EP | 1 800 855 B1 | 2/2013 |

(Continued)

OTHER PUBLICATIONS

International Search Report as issued in International Patent Application No. PCT/EP2022/063630, dated Sep. 26, 2022.

*Primary Examiner* — Lauren R Colgan
(74) *Attorney, Agent, or Firm* — Pillsbury Winthrop Shaw Pittman LLP

(57) ABSTRACT

A composite pane having an electrically conductive coating includes an outer pane having an outer-side surface and an interior-side surface and an inner pane having an outer-side surface and an interior-side surface, wherein the interior-side surface of the outer pane and the outer-side surface of the inner pane are connected to one another by a thermoplastic intermediate layer, and wherein, between the interior-side surface of the outer pane and the outer-side surface of the inner pane, at least: the electrically conductive coating and at least one layer of selectively absorbing nanoparticles having an absorption within the wavelength range of 580 nm to 750 nm are arranged.

20 Claims, 2 Drawing Sheets

Figure 1:
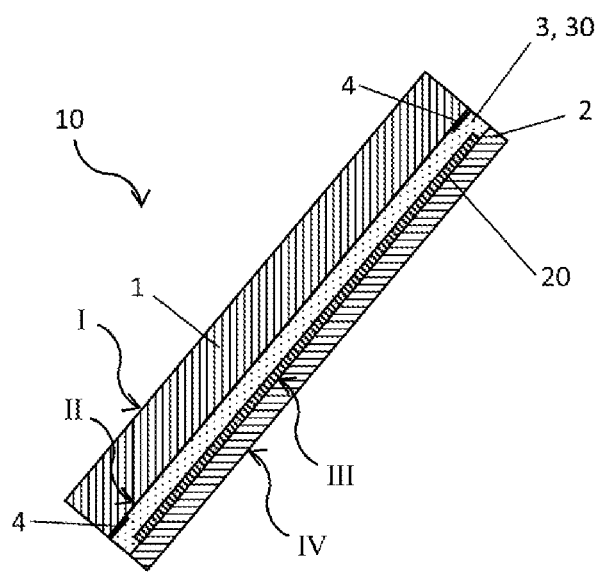

(52) U.S. Cl.
CPC .. *B32B 17/10614* (2013.01); *B32B 17/10761* (2013.01); *B32B 2605/00* (2013.01)

(58) Field of Classification Search
USPC ................................. 428/426, 428, 432, 434
See application file for complete search history.

(56) References Cited

U.S. PATENT DOCUMENTS

| | | | | |
|---|---|---|---|---|
| 2007/0128452 A1* | 6/2007 | Fisher | ................. | G02F 1/16757 |
| | | | | 428/437 |
| 2010/0059495 A1* | 3/2010 | D'Haene | ........... | B32B 17/10688 |
| | | | | 219/203 |
| 2010/0220388 A1* | 9/2010 | Suzuki | .............. | B32B 17/10788 |
| | | | | 359/359 |
| 2015/0202846 A1* | 7/2015 | Byker | ............... | B32B 17/10761 |
| | | | | 204/192.27 |

FOREIGN PATENT DOCUMENTS

| WO | WO 03/024155 A2 | 3/2003 |
|---|---|---|
| WO | WO 2006/122305 A2 | 11/2006 |
| WO | WO 2009/071135 A1 | 6/2009 |
| WO | WO 2013/104438 A1 | 7/2013 |
| WO | WO 2013/104439 A1 | 7/2013 |
| WO | WO 2013/131667 A1 | 9/2013 |

\* cited by examiner

COMPOSITE PANE WITH AN ELECTRICALLY CONDUCTIVE COATING AND AT LEAST ONE LAYER COMPRISING SELECTIVELY ABSORBING NANOPARTICLES

CROSS-REFERENCE TO RELATED APPLICATIONS

This application is the U.S. National Stage of PCT/EP2022/063630, filed May 19, 2022, which in turn claims priority to European patent application number 21176790.0 filed May 31, 2021. The content of these applications are incorporated herein by reference in their entireties.

The invention relates to a composite pane with an electrically conductive coating and at least one layer comprising selectively absorbing nanoparticles.

Composite panes with electrically conductive coatings are well known in the automotive sector, for example as a windshield with a heatable, transparent coating. The coating typically comprises a plurality of silver layers which are applied alternatingly with dielectric layers, which ensures on the one hand high electrical conductivity and, on the other hand, sufficient transmission in the visible spectral range. More complex electrically conductive coatings for windshields are also known which are used, for example, as IR-reflecting coatings in order to reduce the heating of the vehicle interior and thereby improve thermal comfort. However, the coatings can also be used as heatable coatings in that they are connected to a voltage source, so that a current flows through the coating. Suitable coatings contain conductive, metallic layers, in particular based on silver. Since these layers are susceptible to corrosion, it is customary to apply them to the surface of the outer pane or to the inner pane facing the intermediate layer, so that they do not contact the atmosphere. Silver-containing transparent coatings are known, for example, from WO03/024155, US 2007/0082219 A1, US 2007/0020465 A1, WO 2013/104438 or WO 2013/104439.

In addition, so-called low-e coatings are also known which contain, for example, a functional layer made of ITO, for example from WO 2013/131667. In contrast to silver-based coatings, such coatings are not corrosion-sensitive and can therefore be used on an external surface of the composite pane, in particular the interior-side surface of the inner pane.

US 2015/0202846 A1 discloses a PVB film with a low plasticizer content and an electrically conductive or reflective coating.

US 2010/0220388 A1 describes a laminate comprising a layer that absorbs radiation in the wavelength range from 200 nm to 500 nm.

In particular in the automotive sector, solar control coatings are sought which are not only heatable but also have a low total solar transmittance (TTS), a low external reflection and neutral or blue and green, respectively, reflection colors. In particular yellow, red and violet reflection colors are perceived as annoying and are to be avoided. Good solar control properties of vehicle glazings also help to reduce the energy consumption of the air-conditioning system and are therefore desirable from an environmental point of view. In electric automobiles, reduced energy consumption of secondary systems, such as the air-conditioning system and heater, means an increase in range. A low total solar transmittance (TTS) is generally accompanied by a high external reflectivity of the coating, but the lowest possible level of the two variables is desirable in practice. In addition, windshields must comply with the legal requirements set forth in ECE-R 43, Annex 3, § 9.1 for testing the light transmittance of motor vehicle windows, according to which the total transmittance TL must be at least 70%. This makes low total solar transmittance more difficult. These requirements for low total solar transmittance, heatability of the coating and adequate light transmittance often result in the fact that the criterion of a visually appealing reflective color of the coating cannot be met. In addition to the reddish reflection color of the coating that is scarcely acceptable to the end customer, the reflection color of images reflected on the composite pane is also affected. For example, when the composite pane is used as a head-up display, a red-shifted ghost image appears.

There is therefore a need for composite panes with electrically conductive coatings with a neutral coloring, in particular a neutral external reflection color. The object of the present invention is to provide such an improved composite pane.

The object of the present invention is achieved according to the invention by a composite pane according to claim 1. Preferred embodiments are apparent from the dependent claims.

The composite pane according to the invention comprises an outer pane with an outer-side surface (side I) and an interior-side surface (side II), an inner pane with an outer-side surface (side III) and an interior-side surface (side IV) and a thermoplastic intermediate layer which connects the interior-side surface of the outer pane to the outer-side surface of the inner pane, wherein the composite pane between the outer pane and the inner pane has at least one electrically conductive coating and at least one layer of selectively absorbing nanoparticles. The electrically conductive coating and the layer of selectively absorbing nanoparticles are arranged flat over one another, wherein the layer sequence of the two elements can vary, and these can be arranged directly or indirectly adjacent. In this sense, arranged flat over one another means that the projection of the layer of selectively absorbing nanoparticles into the plane of the electrically conductive coating is at least partially congruent with the electrically conductive coating. The layer of selectively absorbing nanoparticles has an absorption within the wavelength range of 580 nm to 750 nm. The layer of selectively absorbing nanoparticles absorbs electromagnetic radiation of one or more wavelengths within this wavelength range, which corresponds to the yellow or red regions of the visible light spectrum. Light reflected from the electrically conductive coating which, after being reflected off the coating, passes through the layer of selectively reflecting nanoparticles is filtered in its coloration. The layer of selectively absorbing nanoparticles has a selective absorption in the wavelength range from 580 nm to 750 nm, while the absorption in the remaining wavelength range of visible light takes place only to a lesser extent. After passing through the layer of selectively absorbing nanoparticles, the light intensity in the yellow and red regions, respectively, is greatly attenuated. As a result of the absorption in the red region of the visible light spectrum, the overall coloring of the composite pane is accordingly shifted to blue-green. The reddish reflection color caused by the electrically conductive coating can therefore be compensated. This results in a more neutral color impression. Bluish or greenish reflection colors are perceived as pleasant by the end customer and vehicle manufacturer and unlike red hues are accepted. The invention therefore makes it possible to select electrically conductive coatings primarily with regard to their electrical properties and total solar transmittance, wherein the reflection color of the coating plays a subordinate or no role.

The composite pane is provided for separating the interior from the external environment in a window opening, in particular the window opening of a vehicle. In the sense of the invention, the term inner pane refers to the pane of the composite pane facing the interior (in particular the vehicle interior). Outer pane refers to the pane facing the external environment. The composite pane is preferably a vehicle windshield (in particular the windshield of a motor vehicle, for example a passenger vehicle or truck), or preferably a vehicle roof window. The outer pane and the inner pane each have an outer-side and an interior-side surface and a peripheral side edge extending between them. Within the sense of the invention, the outer-side surface refers to that main surface which is provided to face the external environment in the installed position. Within the sense of the invention, the interior-side surface refers to that main surface which is provided to face the interior in the installed position. The interior-side surface of the outer pane and the outer-side surface of the inner pane face one another and are connected to one another by the thermoplastic intermediate layer.

The intermediate layer of the composite pane is formed by at least one layer of thermoplastic material. The intermediate layer can consist of this one layer of thermoplastic material and can be formed, for example, from a single polymer film or casting resin layer. However, the intermediate layer can also comprise a plurality of layers of thermoplastic material and can be formed, for example, from a plurality of polymer films arranged flat on top of one another. Particularly preferably, the intermediate layer comprises one or more thermoplastic composite films. A plurality of thermoplastic composite films are used in particular if the thermoplastic intermediate layer comprises carrier films which are placed between the thermoplastic composite films.

The composite pane also has at least one layer of selectively absorbing nanoparticles. The at least one layer of selectively absorbing nanoparticles can be arranged on the outer side and/or on the interior side of the electrically conductive coating. The outer-side arrangement is preferred, because in this way, the reflective color visible from the outer side of the vehicle environment can be advantageously influenced. The outer-side arrangement means that the layer of selectively absorbing nanoparticles is located between the outer-side surface of the outer pane and the conductive coating. In the case of the interior-side arrangement, the layer of selectively absorbing nanoparticles is located between the interior-side surface of the inner pane and the conductive coating. The at least one layer of selectively absorbing nanoparticles preferably overlaps the entire conductive coating in view through the composite pane.

The at least one layer of selectively absorbing nanoparticles is preferably formed by a thermoplastic film of the intermediate layer into which selectively absorbing nanoparticles are embedded. Alternatively, a layer of selectively absorbing nanoparticles can be applied to another layer of the layer stack. Particularly preferably, the thermoplastic intermediate layer is formed from at least one thermoplastic film, and selectively absorbing nanoparticles are embedded in the at least one thermoplastic film in order to form from the thermoplastic film the layer of selectively absorbing nanoparticles, wherein in particular in the at least one thermoplastic film, at least 0.1 wt % (percent by weight), preferably at least 1 wt %, of selectively absorbing nanoparticles are embedded. For example, between 1 wt % and 5 wt % of selectively absorbing nanoparticles can be embedded in at least one thermoplastic film.

Various positionings of the at least one layer of selectively absorbing nanoparticles are therefore possible:
  on a surface of one of the panes, in particular on the interior-side surface of the outer pane and/or on the outer-side surface of the inner pane.
  embedded in the intermediate layer on a carrier film. The carrier film can be formed, for example, from polyethylene terephthalate (PET) with a thickness of about 50 µm and be arranged between two layers of thermoplastic material.
  embedded in a thermoplastic composite film of the intermediate layer.

The electrically conductive coating is preferably arranged on the interior-side surface of the outer pane or the outer-side surface of the inner pane. Alternatively, the electrically conductive coating can be arranged on a carrier film which is inserted between two thermoplastic composite films of the intermediate layer. The carrier film can be formed, for example, from polyethylene terephthalate (PET) with a thickness of approximately 50 µm.

In a preferred embodiment, the at least one layer of selectively absorbing nanoparticles is arranged on the outer side of the electrically conductive coating. Accordingly, the distance of at least one layer of selectively absorbing nanoparticles from the outer pane is less than the distance between the electrically conductive coating and the outer pane. Ambient light impinging on the composite pane therefore falls onto the outer pane of the composite pane, passes through the at least one layer of selectively absorbing nanoparticles, is partially reflected at the electrically conductive coating, wherein the reflected light component in turn passes through the at least one layer of selectively absorbing nanoparticles, exits at the outer pane of the composite pane, and is perceived there as a reflection color. When the light passes through the layer of selectively absorbing nanoparticles, a portion of the light in the yellow or red region of the spectrum is removed by absorption so that the outer-side reflection color appears neutral to greenish or bluish.

In another preferred embodiment, at least one layer of selectively absorbing nanoparticles is arranged on the inner side of the electrically conductive coating. The distance between the at least one layer of selectively absorbing nanoparticles and the inner pane is less than the distance between the electrically conductive coating and the inner pane. Light impinging on the composite pane from the side of the vehicle interior therefore falls onto the inner pane of the composite pane, passes through the at least one layer of selectively absorbing nanoparticles, is partially reflected at the electrically conductive coating, wherein the reflected light component in turn passes through the at least one layer of selectively absorbing nanoparticles, exits at the inner pane of the composite pane and is perceived there as reflection color. In this case as well, absorption of the yellow or red light component by the layer of selectively absorbing nanoparticles shifts the interior-side reflection color toward neutral or slightly bluish or greenish color impressions.

In another preferred embodiment, the composite pane has at least two layers of selectively absorbing nanoparticles, wherein the electrically conductive coating is arranged between the layers of selectively absorbing nanoparticles. In this way, both the reflection color visible on the outer side of the composite pane and the reflection color on the inner side of the composite pane can be shifted toward an attractive hue.

The electrically conductive coating and the at least one layer of selectively absorbing nanoparticles can each be applied to the interior-side surface (II) of the outer pane, to the outer-side surface (III) of the inner pane, and/or to a carrier film inserted in the thermoplastic intermediate layer. Moreover, the layer of selectively absorbing nanoparticles may be directly formed in the thermoplastic intermediate layer in that a material of a thermoplastic composite film of the thermoplastic intermediate layer has selectively absorbing nanoparticles.

Particularly preferably, the at least one layer of selectively absorbing nanoparticles is arranged on the outer side of the electrically conductive coating, wherein the electrically conductive coating is arranged on the outer-side surface (III) of the inner pane, and the at least one layer of selectively absorbing nanoparticles is arranged within the intermediate layer. The layer of selectively absorbing nanoparticles can be arranged on a carrier film inserted in the intermediate layer. In particular, however, the nanoparticles are incorporated directly into the material of a thermoplastic composite film of the intermediate layer. Electrically conductive coatings on glass substrates can be implemented cost-effectively and at very good quality using industrially applicable methods such as magnetron sputtering. If the layer of selectively reflecting nanoparticles is integrated directly in the material of the thermoplastic intermediate layer, the existing production process can be continued unchanged, whereby only one additional intermediate layer is provided. Furthermore, the attractive external reflection color achieved in this embodiment is a decisive criterion for vehicle manufacturers and end customers.

In another particularly preferred embodiment, the at least one layer of selectively absorbing nanoparticles is arranged on the interior side of the electrically conductive coating, wherein the electrically conductive coating is arranged on the interior-side surface (II) of the outer pane, and the at least one layer of selectively absorbing nanoparticles is arranged within the intermediate layer. The layer of selectively absorbing nanoparticles can be arranged on a carrier film inserted in the intermediate layer, but in particular the nanoparticles are also introduced directly in this case in the material of a thermoplastic composite film of the intermediate layer. This embodiment is preferred provided that, above all, the color of the interior-side reflection visible in the interior of the vehicle is to be improved. This is particularly advantageous for reflection-based display applications, such as head-up displays.

In another possible embodiment, the composite pane has an electrically conductive coating between at least two layers of selectively absorbing nanoparticles, wherein the electrically conductive coating is applied to a carrier film which is inserted in the thermoplastic intermediate layer. The at least two layers of selectively absorbing nanoparticles are in each case arranged on the interior-side surface (II) of the outer pane and the outer-side surface of the inner pane (III). Particularly preferably, one or both layers of selectively absorbing nanoparticles are integrated directly over the thermoplastic composite films of the intermediate layer surrounding the carrier film by adding the nanoparticles to the material of the intermediate layer. Such an embodiment is advantageous provided that adjustment of the reflection color on both sides is desired. Alternatively, one or both layers of selectively absorbing nanoparticles could likewise be introduced into the layer stack using carrier films.

The thermoplastic intermediate layer is formed from at least one thermoplastic composite film. If a carrier film is to be integrated into the layer stack of the composite pane, the intermediate layer will comprise at least two thermoplastic composite films between which the carrier film is inserted. The thermoplastic composite films can also be composed of a plurality of individual composite films. The thermoplastic intermediate layer comprises at least one thermoplastic polymer, preferably ethylene vinyl acetate (EVA), polyvinyl butyral (PVB) or polyurethane (PU), or mixtures, or copolymers, or derivatives thereof, particularly preferably PVB. The thickness of the intermediate layer is preferably from 0.2 mm to 2 mm, particularly preferably from 0.3 mm to 1 mm. If a wedge-shaped intermediate layer is used, the thickness is determined at the thinnest point, typically at the lower edge of the composite pane.

Preferably, the layer of selectively absorbing nanoparticles is formed directly in the thermoplastic intermediate layer itself. For this purpose, selectively absorbing nanoparticles are embedded in at least one thermoplastic composite film in order to form from the thermoplastic film the layer of selectively absorbing nanoparticles. This has the advantage that, on the one hand, no additional carrier films are required and, on the other hand, no additional steps for applying the nanoparticles to a pane surface are necessary. The thermoplastic composite film which comprises the layer of selectively absorbing nanoparticles can be inserted into the layer stack of the composite pane without changing the production process. The composite film comprising the layer of selectively absorbing nanoparticles is produced in advance and does not influence the production process of the composite pane.

The layer of selectively absorbing nanoparticles preferably comprises nanoparticles based on semiconductor materials, particularly preferably based on silicon (Si), zinc selenide (ZnSe) and/or cadmium telluride (CeTe), and/or based on perovskites. The inventors have determined that these materials provide sufficient selective absorption. In particular, perovskites have proven to be particularly suitable in this regard. Particularly suitable are nanoparticles based on halogen-containing cesium-lead perovskites, for example $CsPbI_3$ or $CsPb(I/Br)_3$. The term "perovskite" describes compounds of the general structure $ABX_3$, wherein A and B are cations, the diameter of A is greater than that of B, and X is anionic oxides ($O^{2-}$) or halogens ($F^-$, $Br^-$, $I^-$). In addition, there are also perovskites with a mixed cation structure of the type $(AA')(BB')O_6$, wherein the A and A' cations and the B and B' cations are in each case arranged on the lattice sites A and B.

Preferably, the layer of selectively absorbing nanoparticles has an absorption in the wavelength range from 580 nm to 700 nm, particularly preferably in the wavelength range from 590 nm to 690 nm. In this way, red hues of the reflection color can be avoided particularly effectively.

The layer of selectively absorbing nanoparticles preferably has an absorption of at least 20%, preferably at least 30%, particularly preferably at least 40% within the selectively absorbing wavelength range.

The electrically conductive coating is preferably applied to the inner pane or the outer pane; that is to say, the outer-side surface of the inner pane facing the intermediate layer or the interior-side surface of the outer pane facing the intermediate layer. The coating can alternatively be arranged within the intermediate layer. For this purpose, the coating is typically applied to a carrier film, for example made of polyethylene terephthalate (PET), with a thickness of about 50 μm which is arranged between two layers of thermoplastic material, for example between two polymer films. Preferably, at least 80% of the pane surface is provided with the coating according to the invention. In particular, the composite pane is provided with the coating over the entire surface with the exception of a circumferential edge region and optionally local region, which are intended to ensure the transmission of electromagnetic radiation through the composite pane as a communication, sensor or camera window, and therefore are not provided with the coating. The peripheral uncoated edge region has, for example, a width of up to 20 cm. It prevents direct contact of the coating with the surrounding atmosphere, so that the coating in the interior of the composite pane is protected against corrosion and damage.

The electrically conductive coating is in particular a transparent, electrically conductive coating. The conductive coating can be provided, for example, as an IR-reflective solar control coating, or also as a heatable coating that is electrically contacted and heats up when current flows through. In a particularly preferred embodiment, the composite pane is a windshield of a motor vehicle, wherein the electrically conductive coating is transparent. A transparent coating is understood to mean a coating which has an average transmittance in the visible spectral range of at least 70%, preferably at least 75%, which therefore does not significantly restrict the view through the pane. If the composite pane is provided, for example, as a roof glazing of a motor vehicle, the transmittance of the coating can also be correspondingly lower.

The electrically conductive coating comprises at least one electrically conductive layer. The conductive layer can be metal-containing, in particular based on silver, as is customary for IR-reflecting solar control coatings and heatable coatings.

The electrically conductive coating is preferably a layer stack or a layer sequence comprising one or more electrically conductive, in particular metal-containing layers, wherein each electrically conductive layer is arranged in each case between two dielectric layers or layer sequence. The coating is therefore a thin-film stack with n electrically conductive layers and (n+1) dielectric layers or layer sequences, wherein n is a natural number, and wherein a conductive layer and a dielectric layer or layer sequence always alternatingly follows a lower dielectric layer or layer sequence. Such coatings are known as solar control coatings and heatable coatings, wherein the electrically conductive layers are typically formed on the basis of silver. The conductive coating preferably comprises at least two electrically conductive layers, particularly preferably at least three electrically conductive layers, very particularly preferably at least four electrically conductive layers. The higher the number of conductive layers, the better the coating can be optimized with regard to a desired transmittance, coloring, or a desired sheet resistance.

The electrical conductivity of the coating is brought about by the functional, electrically conductive layers. By dividing the entire conductive material into several separate layers, each of these can be made thinner, thereby increasing the transparency of the coating. Each electrically conductive layer preferably contains at least one metal or a metal alloy, for example silver, aluminum, copper or gold, and is particularly preferably formed on the basis of the metal or the metal alloy, i.e. consists essentially of the metal or the metal alloy apart from any dopants or impurities. Silver or a silver-containing alloy are preferably used. In an advantageous embodiment, the electrically conductive layer contains at least 90 wt % silver, preferably at least 99 wt % silver, particularly preferably at least 99.9 wt % silver.

In a particularly preferred embodiment, the conductive coating contains at least three electrically conductive layers, in particular based on silver. Such coatings often result in a red reflection color, so that the invention reveals its advantages here to a particular extent.

According to the invention, dielectric layers or layer sequences are arranged between the electrically conductive layers and below the lowermost conductive layer and above the uppermost conductive layer. Each dielectric layer or layer sequence has at least one anti-reflective layer. The anti-reflective layers reduce the reflection of visible light and therefore increase the transparency of the coated pane. The anti-reflective layers contain, for example, silicon nitride (SiN), silicon-metal mixed nitrides such as silicon zirconium nitride (SiZrN), aluminum nitride (AlN) or tin oxide ($SnO_2$). The anti-reflective layers can moreover have dopants.

The anti-reflective layers can in turn be subdivided into at least two sub-layers, in particular into a dielectric layer having a refractive index of less than 2.1, and an optically highly refractive layer having a refractive index greater than or equal to 2.1. Preferably, at least one anti-reflective layer arranged between two electrically conductive layers is subdivided in this manner, particularly preferably each anti-reflective layer arranged between two electrically conductive layers. The subdivision of the anti-reflective layer results in a lower sheet resistance of the electrically conductive coating with simultaneously high transmission and high color neutrality. The order of the two partial layers can in principle be selected as desired, wherein the optically highly refractive layer is preferably arranged above the dielectric layer, which is particularly advantageous with regard to sheet resistance. The thickness of the optically highly refractive layer is preferably from 10% to 99%, particularly preferably from 25% to 75% of the total thickness of the anti-reflective layer.

The optically highly refractive layer having a refractive index greater than or equal to 2.1 contains, for example, a silicon/metal mixed nitride, for example mixed silicon/zirconium nitride (SiZrN). This is particularly advantageous with regard to the sheet resistance of the electrically conductive coating. The mixed silicon/zirconium nitride preferably has dopants. The layer of an optically highly refractive material can contain, for example, an aluminum-doped mixed silicon/zirconium nitride.

The dielectric layer with a refractive index of less than 2.1 preferably has a refractive index n between 1.6 and 2.1, particularly preferably between 1.9 and 2.1. The dielectric layer preferably contains at least one oxide and/or a nitride, particularly preferably silicon nitride.

In an advantageous embodiment, one or more dielectric layer sequences have a first adaptation layer, preferably each dielectric layer sequence which is arranged below an electrically conductive layer. The first adaptation layer is preferably arranged above the anti-reflection layer.

In an advantageous embodiment, one or more dielectric layer sequences have a smoothing layer, preferably each dielectric layer sequence, which is arranged between two electrically conductive layers. The smoothing layer is arranged below one of the first adaptation layers, preferably between the anti-reflective layer and the first adaptation layer. The smoothing layer is particularly preferably in direct contact with the first adaptation layer. The smoothing layer yields an optimization, in particular smoothing of the surface for an electrically conductive layer subsequently applied above. An electrically conductive layer deposited on a smoother surface has a higher transmittance with a simultaneously lower sheet resistance. The smoothing layer preferably has a refractive index of less than 2.2.

The smoothing layer preferably contains at least one non-crystalline oxide. The oxide may be amorphous or partially amorphous (and therefore partially crystalline), but is not completely crystalline. The non-crystalline smoothing layer has a low roughness and therefore forms an advantageously smooth surface for the layers to be applied above the smoothing layer. The non-crystalline smoothing layer also effects an improved surface structure of the layer, which is preferably the first adaptation layer, deposited directly above the smoothing layer. The smoothing layer can contain, for example, at least one oxide of one or more of the elements tin, silicon, titanium, zirconium, hafnium, zinc, gallium and indium. The smoothing layer particularly preferably contains a non-crystalline mixed oxide. The smoothing layer particularly preferably contains a tin/zinc mixed oxide (ZnSnO). The mixed oxide can have dopants. The smoothing layer can contain, for example, an antimony-doped tin/zinc mixed oxide. The mixed oxide preferably has a sub-stoichiometric oxygen content.

In an advantageous embodiment, one or more dielectric layer sequences have a second adaptation layer, preferably each dielectric layer sequence arranged above an electrically conductive layer. The second adaptation layer is preferably arranged below the anti-reflection layer.

The first and second adaptation layers cause an improvement of the sheet resistance of the coating. The first adaptation layer and/or the second adaptation layer preferably contain zinc oxide $ZnO_{1-\delta}$ with $0\leq\delta\leq0.01$. The first adaptation layer and/or the second adaptation layer also preferably contain dopants. The first adaptation layer and/or the second adaptation layer can contain aluminum-doped zinc oxide (ZnO:Al), for example. The zinc oxide is preferably deposited sub-stoichiometrically with respect to the oxygen in order to avoid a reaction of excess oxygen with the silver-containing layer.

In an advantageous embodiment, the electrically conductive coating comprises one or more blocker layers. At least one blocker layer, particularly preferably each electrically conductive layer, is preferably associated with at least one blocker layer. The blocker layer is in direct contact with the electrically conductive layer and is arranged directly above or directly below the electrically conductive layer. No additional layer is therefore arranged between the electrically conductive layer and the blocker layer. A blocker layer can also be arranged directly above and directly below a conductive layer. The blocker layer preferably contains niobium, titanium, nickel, chromium and/or alloys thereof, particularly preferably nickel-chromium alloys. A blocker layer directly below the electrically conductive layer serves in particular for stabilizing the electrically conductive layer during a temperature treatment and improves the optical quality of the electrically conductive coating. A blocker layer directly above the electrically conductive layer prevents contact of the sensitive electrically conductive layer with the oxidizing reactive atmosphere during the deposition of the following layer by reactive cathode sputtering, for example of the second adaptation layer.

If a first layer is arranged above a second layer, this means, in the sense of the invention, that the first layer is arranged further away from the substrate on which the coating is applied than the second layer. If a first layer is arranged below a second layer, this means, in the sense of the invention, that the second layer is arranged further away from the substrate than the first layer. If a first layer is arranged above or below a second layer, this does not necessarily mean, in the sense of the invention, that the first and the second layer are in direct contact with one another.

One or more additional layers can be arranged between the first and the second layer, provided that this is not explicitly ruled out. The indicated values for refractive indices are measured at a wavelength of 550 nm. If a layer based on a material is formed, the layer consists of a majority of this material in addition to any impurities or dopants.

If the electrically conductive coating is provided as a heating coating, this is electrically connected to an external voltage source in a manner known per se, wherein the heating of the coating takes place by applying a voltage. The electrical contact is realized by suitable connecting cables, for example foil conductors, which are preferably connected to the electrically conductive coating via so-called busbars, for example strips of an electrically conductive material or electrically conductive imprints.

Preferably, at least two busbars are attached to the electrically conductive coating and are electrically conductively connected thereto. These at least two busbars are preferably attached along mutually opposite edges of the composite pane and can be electrically conductively connected to opposite poles of a voltage source for heating the pane. The coating region between the busbars is electrically heatable in this case. In one possible embodiment of the invention, three busbars are applied, wherein one busbar runs parallel to each of the horizontal edges of the pane when the composite pane is installed as a windshield of a motor vehicle, and the third busbar projects from the edge of the roof in the direction of the center of the pane. The first busbar is located adjacent to the roof edge, while the second busbar is adjacent to the motor edge, and both busbars run parallel to these horizontal side edges. In a particularly preferred embodiment, one or more busbars are adapted in their shape to any decoated regions for sensor windows which serve to attach sensors. The busbars have a thickness of 5 μm to 20 μm, preferably 8 μm to 15 μm. The width of the busbars is 0.5 mm to 30 mm, preferably 1 mm to 20 mm.

An opaque covering layer, for example in the form of a screen print, is preferably applied in the edge region of the composite pane, so that this screen print circumscribes the field of view of the pane or forms its outer edge. A busbar and electrical conductors, which may be arranged in the edge region of the composite pane, and an optionally provided coating-free edge region are preferably covered by this cover imprint and are therefore visually concealed. The opaque screen print is attached, for example, to the outer-side surface (side III) of the inner pane and/or to the interior-side surface (side II) of the outer pane. Preferably, the electrically conductive coating is preferably missing along a peripheral strip along the peripheral edge of the composite pane. This region without a coating is hidden by the opaque cover imprint. As a result, the composite pane has a visually attractive appearance.

In one possible embodiment, the composite pane is used as a windshield comprising a projection surface for a head-up display (HUD). An HUD projector is arranged in the vehicle interior and projects an image onto the composite pane from the side of the interior-side surface of the inner pane. HUD projectors are predominantly operated with s-polarized radiation and irradiate the windshield with an angle of incidence of approximately 65%, which is close to the Brewster angle for an air-glass transition. In this context, the problem arises that the projector image is reflected on both external surfaces of the windshield. A further reflection occurs on the electrically conductive coating. As a result, in addition to the desired main image, a slightly offset secondary image also occurs, so-called ghost images. The problem is usually reduced by arranging the pane surfaces at an angle to one another, in particular by using a wedge-like intermediate layer for laminating the windshields designed as a composite pane, so that the main image and the ghost image are superimposed on one another. Laminated glasses with wedge films for HUDs are known, for example, from WO 2009/071135 A1, EP1800855B1 or EP1880243A2. In a preferred embodiment of the composite pane, this intermediate layer comprises at least one wedge-shaped thermoplastic composite film.

The outer pane and the inner pane are preferably made of glass, in particular of soda-lime glass, which is customary for window panes. In principle, however, the panes can also be produced from other types of glass (for example borosilicate glass, quartz glass, aluminosilicate glass) or transparent plastics (for example polymethyl methacrylate or polycarbonate). The thickness of the outer pane and the inner pane can vary widely. Preferably, panes having a thickness in the range from 0.7 mm to 5 mm, preferably from 1.4 mm to 2.5 mm, are used, for example those with the standard thicknesses of 1.6 mm or 2.1 mm.

The outer pane, the inner pane and the thermoplastic intermediate layer can be clear and colorless, but also tinted or colored. The total transmittance through the composite glass is greater than 70% in a preferred embodiment. The term total transmittance relates to the method defined by ECE-R 43, Annex 3, § 9.1 for testing the light transmittance of motor vehicle panes. Independently of each other the outer pane and the inner panes can be not prestressed, partially prestressed or prestressed. If at least one of the panes should be prestressed, this can be thermal or chemical prestressing.

The composite pane is preferably curved in one or more spatial directions, as is usual for motor vehicle panes, wherein the typical radii of curvature are in a range of approximately 10 cm to approximately 40 m. However, the composite pane can also be flat, for example if it is provided as a pane for buses, trains or tractors.

The composite pane can be produced by methods known per se. The outer pane and the inner pane are laminated together via the intermediate layer, for example by autoclave processes, vacuum bag processes, vacuum ring processes, calendering processes, vacuum laminators, or combinations thereof. The outer pane and inner pane are usually connected under the effect of heat, vacuum and/or pressure.

The layer of selectively absorbing nanoparticles can be applied, for example, in the form of a solution comprising selectively absorbing nanoparticles on a pane surface, carrier film or thermoplastic composite film in order to form the layer of selectively absorbing nanoparticles. Preferably, selectively absorbing nanoparticles are introduced directly into the thermoplastic starting material during the extrusion of the thermoplastic composite film, so that the layer of selectively absorbing nanoparticles is formed directly in the thermoplastic composite film.

The electrically conductive coating is preferably applied to the substrate by physical vapor deposition (PVD), particularly preferably by cathode sputtering, very particularly preferably by magnetic field-assisted cathode sputtering. The coatings are preferably applied to the panes before lamination. Instead of applying the electrically conductive coating to a pane surface, it can in principle also be provided on a carrier film which is arranged in the intermediate layer.

If the composite pane is to be curved, the outer pane and the inner pane are preferably subjected to a bending process before lamination and preferably after any coating processes. Preferably, the outer pane and the inner pane are curved together congruently (i.e. simultaneously and by the same tool) because this optimally matches the shape of the panes to one another for the subsequent lamination. Typical temperatures for glass-bending processes are, for example, 500° C. to 700° C.

The invention also comprises the use of the composite pane as a windshield, rear window, side window and/or roof window, particularly preferably as a windshield of a motor vehicle.

In the following, the invention is explained in more detail with the aid of a drawing and examples of embodiments. The drawing is a schematic diagram and not to scale. The drawing does not limit the invention in any way.

Figure 2A:
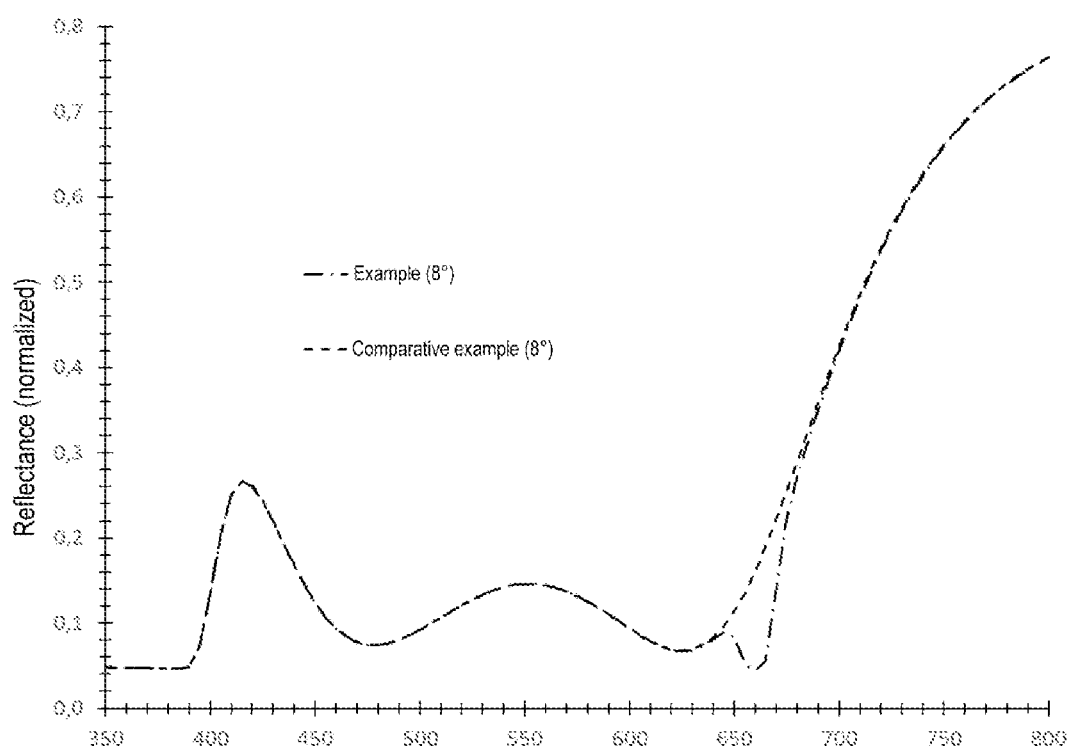
Figure 2B:
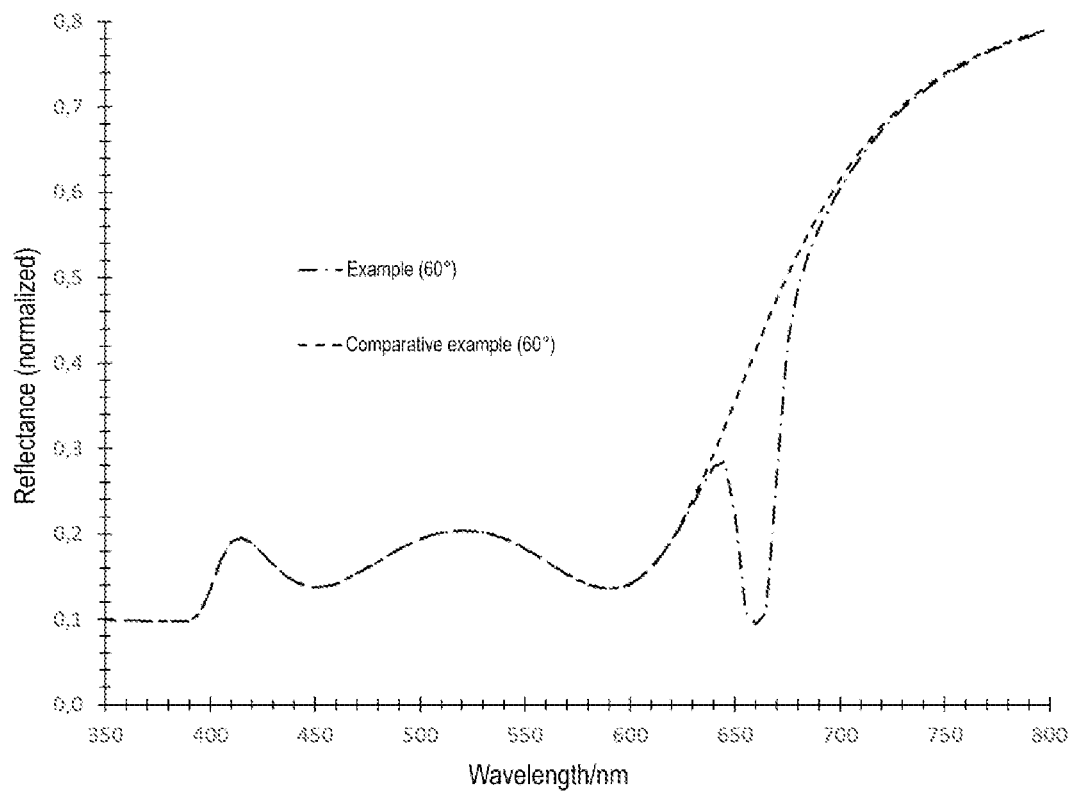
Figure 3:
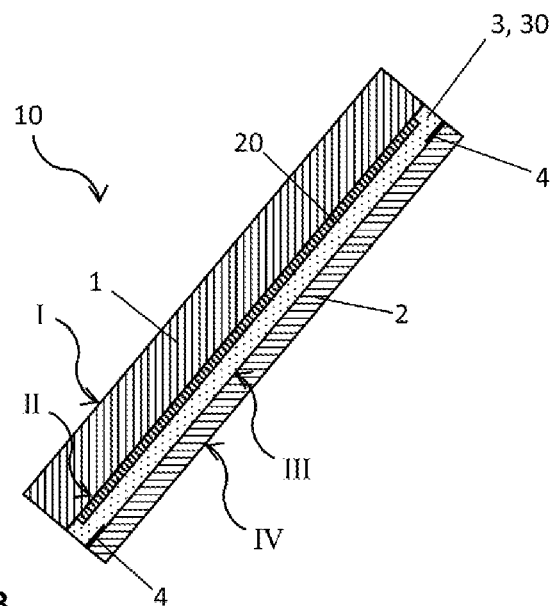

In the drawings:

FIG. 1 shows an embodiment of the composite pane according to the invention comprising an electrically conductive coating on the outer-side surface of the inner pane and a layer of selectively absorbing nanoparticles in the thermoplastic composite film, FIG. 2a shows a reflection spectrum of a composite pane according to the invention according to FIG. 1 in comparison with a reflection spectrum of a composite pane not according to the invention, measured in each case at 8°, FIG. 2b shows a reflection spectrum of a composite pane according to the invention according to FIG. 1 in comparison with a reflection spectrum of a composite pane not according to the invention, measured in each case at 60°, FIG. 3 shows another embodiment of a composite pane according to the invention comprising an electrically conductive coating on the interior-side surface of the outer pane, and a layer of selectively absorbing nanoparticles in the thermoplastic composite film.

FIG. 1 shows a cross-section of an embodiment of a composite pane 10 according to the invention, which is provided as a windshield of a passenger vehicle. The composite pane 10 is constructed from an outer pane 1 and an inner pane 2, which are connected to one another via a thermoplastic intermediate layer 3. In the installed position, the outer pane 1 faces the external environment; the inner pane 2 faces the vehicle interior. The outer pane 1 has an outer-side surface I which, in the installed position, faces the external environment, and an interior-side surface II which faces the interior in the installed position. Likewise, the inner pane 2 has an outer-side surface III which faces the external environment in the installed position, and an interior-side surface IV which faces the interior in the installed position.

The outer pane 1 and the inner pane 2 consist, for example, of soda-lime glass. The outer pane 1 has, for example, a thickness of 2.1 mm; the inner pane 2 has a thickness of 1.6 mm. The thermoplastic intermediate layer 3 is formed from a single thermoplastic composite film, for example from a PVB film with a thickness of 0.76 mm.

The composite pane 10 also comprises an electrically conductive coating 20 which is applied on the outer-side surface III of the inner pane 2 and is provided as a heatable coating. The electrically conductive coating 20 has busbars and electrical feed lines for electrically contacting the coating 20 with a voltage source (not shown).

The thermoplastic intermediate layer 3 comprises a layer of selectively absorbing nanoparticles 30 in the sense that the nanoparticles are introduced directly into the material of the thermoplastic composite film. Nanoparticles based on $CsPBI_3$ which manifest selective absorption of light in the wavelength range from 610 nm to 700 nm are used as the selectively absorbing nanoparticles. The layer of selectively absorbing nanoparticles 30 therefore absorbs in the red region of the visible light spectrum. As a result, the red cast, which is caused by the conductive coating 20, is compensated. The external reflection color is shifted to blue, resulting in a more pleasant color impression.

Table 1 shows an exemplary structure of an electrically conductive coating 20 with an indication of the materials and layer thicknesses. The coating 20 is applied to the inner pane 2, wherein the layer sequence corresponds to the one shown in Table 1. The electrically conductive coating contains three electrically conductive layers 21.1, 21.2, 21.3. Each electrically conductive layer 21 is in each case arranged between two of a total of four anti-reflection layers 22.1, 22.2, 22.3, 22.4. The anti-reflection layers 22.3, 22.4 are each divided into a dielectric layer 22a.3, 22a.4, and an optically highly refractive layer 22b.3, 22b.4. The coating 20 also contains three smoothing layers 23.1, 23.2, 23.3, three first adaptation layers 24.1, 24.2, 24.3, three second adaptation layers 25.2, 25.3, 25.4 and three blocker layers 26.1, 26.2, 26.3.

TABLE 1

|  | Reference signs | | Layer thickness |
| --- | --- | --- | --- |
| SiZrN | 22b.4 | 22.4 | 9.6 nm |
| $Si_3N_4$ | 22a.4 | | 9.9 nm |
| ZnO | 25.4 | | 13.0 nm |
| NiCr | 26.3 | | 0.2 nm |
| Ag | 21.3 | | 9.0 nm |
| ZnO | 24.3 | | 14.0 nm |
| ZnSnO | 23.3 | | 7.0 nm |
| SiZrN | 22b.3 | 22.3 | 21.3 nm |
| $Si_3N_4$ | 22a.3 | | 25.8 nm |
| ZnO | 25.3 | | 10.0 nm |
| NiCr | 26.2 | | 0.3 nm |
| Ag | 21.2 | | 9.5 nm |
| ZnO | 24.2 | | 9.0 nm |
| ZnSnO | 23.2 | | 8.0 nm |
| SiZrN | 22.2 | | 42.5 nm |
| ZnO | 25.2 | | 12.0 nm |
| NiCr | 26.1 | | 0.2 nm |
| Ag | 21.1 | | 9.5 nm |
| ZnO | 24.1 | | 13.0 nm |
| ZnSnO | 23.1 | | 7.0 nm |
| SiZrN | 22.1 | | 10.9 nm |
| Glass | 2 | | 1.6 mm |

EXAMPLE

A composite pane 10 according to the invention according to FIG. 1 was produced, wherein the electrically conductive coating 20 was formed according to Table 1. A composite pane not according to the invention was likewise formed as a comparative example, with the difference that, in the comparative example, a layer of selectively absorbing nanoparticles 30 was dispensed with. The observations of the reflection color (measured at an angle of 8° or 60°) are summarized in Table 2. The color values a* and b* are indicated in the L*a*b* color space (light source D65), followed by the indication of the observation angle.

TABLE 2

|  | TL/% | a* (8°) | b* (8°) | a* (60°) | b* (60°) |
| --- | --- | --- | --- | --- | --- |
| Comparative example | 72.2 | +0.5 | −5.1 | −1.0 | +5.5 |
| Example | 71.2 | −0.7 | −5.4 | −3.9 | +4.8 |

It can be seen that the a* values are reduced by using the layer of selectively absorbing nanoparticles, while the b* values are likewise slightly reduced. In particular, at an observation angle of 8°, a sign change of the a* value can be observed, wherein the reflection color is shifted from an undesired red-blue hue towards green-blue. The resulting color is therefore more neutral and more pleasant for the observer. In both cases, the total transmittance (light source A) is above 70% in both cases, so that the panes are suitable as windshields.

FIGS. 2a and 2b show reflection spectra of the composite pane 10 according to FIG. 1 with a coating 20 according to Table 1 (example) compared to the composite pane of the comparative example (without a layer of selectively absorbing nanoparticles). FIG. 2a shows the reflection spectra measured at an observation angle of 8°, while the spectra of FIG. 2b have an observation angle of 60°. The reflection spectra of the composite panes according to the example and according to the comparative example each show a strong deviation from one another in the wavelength range from 640 nm to 690 nm, wherein the composite pane according to the invention has an advantageously reduced reflectance in this red region of the spectrum according to the example. The composite pane according to the example of the invention therefore shows a significantly improved reflection color compared to the comparative example, both at an observation angle of 8° and at an observation angle of 60°, wherein there is color change toward green-blue.

FIG. 3 shows another embodiment of the composite pane 10 according to the invention, which substantially corresponds to the embodiment of FIG. 1, wherein in contrast thereto, the electrically conductive coating 20 is applied on the interior-side surface (II) of the outer pane 1. This embodiment is particularly preferred for achieving a pleasing reflection color of a HUD image projected onto the composite pane 10 from the interior-side surface (IV). If the composite pane 10 of FIG. 3 is used as the HUD pane, the thermoplastic intermediate layer 3 comprising the layer of selectively absorbing nanoparticles 30 is preferably designed as a wedge film.

LIST OF REFERENCE SIGNS

(10) Composite pane
(1) Outer pane
(2) Inner pane
(3) Thermoplastic intermediate layer
(4) Opaque cover print
(20) Electrically conductive coating
(21.1), (21.2), (21.3), (21.4) Electrically conductive layers
(22.1), (22.2), (22.3), (22.4) Anti-reflective layers
(22a.3), (22a.4) Dielectric layers
(22b.3), (22b.4) Optically highly refractive layers
(23.1), (23.2), (23.3) Smoothing layers
(24.1), (24.2), (24.3) First adaptation layers
(25.2), (25.3), (25.4) Second adaptation layers
(26.1), (26.2), (26.3) Blocker layers
(30) Layer of selectively absorbing nanoparticles
(I) Outer-side surface of the outer pane 1 facing away from the intermediate layer 3
(II) Interior-side surface of the outer pane 1 facing the intermediate layer 3
(III) Outer-slide surface of the inner pane 2 facing the intermediate layer 3
(IV) Interior-side surface of the inner pane 2 facing away from the intermediate layer 3

The invention claimed is:
1. A composite pane having an electrically conductive coating, at least comprising an outer pane having an outer-side surface and an interior-side surface and an inner pane having an outer-side surface and an interior-side surface, wherein the interior-side surface of the outer pane and the outer-side surface of the inner pane are connected to one another by a thermoplastic intermediate layer, and wherein between the interior-side surface of the outer pane and the outer-side surface of the inner pane at least:
the electrically conductive coating and
at least one layer of selectively absorbing nanoparticles having an absorption within the wavelength range of 580 nm to 750 nm
are arranged flat on top of one another.

2. The composite pane according to claim 1, wherein at least one layer of selectively absorbing nanoparticles is arranged on an outer side of the electrically conductive coating.

3. The composite pane according to claim 2, wherein the electrically conductive coating is arranged on the outer-side surface of the inner pane, and the at least one layer of selectively absorbing nanoparticles is arranged within the intermediate layer.

4. The composite pane according to claim 1, wherein at least one layer of selectively absorbing nanoparticles is arranged on an inner side of the electrically conductive coating.

5. The composite pane according to claim 4, wherein the electrically conductive coating is arranged on the interior-side surface of the outer pane, and the at least one layer of selectively absorbing nanoparticles is arranged within the intermediate layer.

6. The composite pane according to claim 1, wherein the thermoplastic intermediate layer is formed from at least one thermoplastic film, and selectively absorbing nanoparticles are embedded in the at least one thermoplastic film in order to form from the thermoplastic film the layer of selectively absorbing nanoparticles.

7. The composite pane according to claim 6, wherein at least 0.1 wt % of selectively absorbing nanoparticles are embedded in the at least one thermoplastic film.

8. The composite pane according to claim 1, wherein the layer of selectively absorbing nanoparticles comprises nanoparticles based on semiconductor materials and/or based on perovskites.

9. The composite pane according to claim 8, wherein the nanoparticles are based on silicon (Si), zinc selenide (ZnSe) and/or cadmium telluride (CeTe), and/or based on halogen-containing cesium-lead perovskites.

10. The composite pane according to claim 9, wherein the halogen-containing cesium-lead perovskites are $CsPbI_3$ or $CsPb(I/Br)_3$.

11. The composite pane according to claim 1, wherein the layer of selectively absorbing nanoparticles has an absorption in the wavelength range from 580 nm to 700 nm.

12. The composite pane according to claim 11, wherein the wavelength range is from 590 nm to 690 nm.

13. The composite pane according to claim 1, wherein the layer of selectively absorbing nanoparticles has an absorption of at least 20% in the absorbed wavelength range.

14. The composite pane according to claim 13, wherein the layer of selectively absorbing nanoparticles has an absorption of at least 30% in the absorbed wavelength range.

15. The composite pane according to claim 1, wherein the electrically conductive coating comprises at least one electrically conductive layer.

16. The composite pane according to claim 15, wherein the at least one electrically conductive layer comprises silver.

17. The composite pane according to claim 15, wherein the electrically conductive coating comprises at least two electrically conductive layers, each of which is arranged between two dielectric layers or layer sequences.

18. The composite pane according to claim 1, wherein the electrically conductive coating has at least two busbars via which the electrically conductive coating is connectable to an electrical voltage source.

19. A method comprising providing a composite pane according to claim 1 in a motor vehicles.

20. The method according to claim 19, wherein the composite pane is a windshield, a rear window, a side window and/or a roof window.

\* \* \* \* \*